(12) United States Patent
Kelly et al.

(10) Patent No.: US 7,599,379 B2
(45) Date of Patent: *Oct. 6, 2009

(54) REGISTERING STATIONS BETWEEN PROTOCOLS

(75) Inventors: Michael R. Kelly, Omaha, NE (US); Bradley T. Kenyon, Omaha, NE (US); Mark A. Gullett, Monument, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1139 days.

This patent is subject to a terminal disclaimer.

(21) Appl. No.: 10/426,673

(22) Filed: Apr. 30, 2003

(65) Prior Publication Data

US 2004/0218610 A1    Nov. 4, 2004

(51) Int. Cl.
*H04L 12/28* (2006.01)
*H04J 3/16* (2006.01)

(52) U.S. Cl. .................. 370/401; 370/466; 370/331

(58) Field of Classification Search ........... 370/331; 455/433
See application file for complete search history.

(56) References Cited

U.S. PATENT DOCUMENTS

| 6,487,286 B1* | 11/2002 | Reaves et al. ............ 379/221.1 |
| 6,526,033 B1 | 2/2003 | Wang et al. |
| 6,678,242 B1* | 1/2004 | Simon ........................ 370/218 |
| 2002/0169883 A1* | 11/2002 | Bright et al. ................ 709/230 |

OTHER PUBLICATIONS

GSM/ANSI-136 Network Interworking Specification. Phase 1, Version 3.0. Dec. 18, 2000. GAIT Interoperability Team. Apr. 11, 2007.*

* cited by examiner

*Primary Examiner*—Ayaz R. Sheikh
*Assistant Examiner*—Sori A Aga

(57) ABSTRACT

A wireless system including a first network protocol, a second network protocol, and an interoperability node. The interoperability node operable on the system to register a station pending registration at one of the network protocols.

16 Claims, 5 Drawing Sheets

REGISTERING STATIONS BETWEEN PROTOCOLS

INTRODUCTION

Traditionally, wireless devices could only access a network by utilizing either a voice or data connection. Currently, in the wireless industry, devices have been created that can utilize voice and/or data connections. This versatility is limited by several structural limitations within the networks to which these devices connect. For example, when a session is to be initiated by a device, the device is typically programmed to understand a single network protocol and therefore it cannot readily communicate with other networks. Additionally, some networks do not service the entire area in which a device may be utilized and therefore, there are times when the device is inaccessible on a particular network.

With each advance of a new protocol into the industry or the advance of an existing protocol into a new coverage area, the infrastructure providing communication between devices must be changed to accommodate the new or newly available protocol. In order to change the infrastructure without requiring all of their subscribers to purchase devices compatible with a protocol not currently available in their area, many providers are trying to update their existing infrastructure to support both existing protocol and the newly available protocol, at least temporarily. Another approach has been to overlap a new protocol infrastructure over an area covered by an existing protocol. In this way, both, the users of the existing protocol and the users of the newly available protocol, can utilize their devices in the same or similar coverage areas.

Based upon this approach, currently, several networks supporting voice, data, and/or video oftentimes overlap each other, at least partially. In this situation it could be possible for the device to switch from communicating with a first network to a second network. In some situations, it may be less expensive for a user to communicate on one network versus the other, so it would be desirable to switch to the least expensive network, when possible.

However, when two different types of networks are connected and need to communicate information from one to another, a translator must be provided to interpret the information from one set of network protocols to another. Currently, each time a new network is connected to the system, a new translator, or gateway, needs to be installed to do the translating from each of the existing networks connected to the system to and from the new network.

For example, when a global system for mobile communications (GSM) network is connected to another network (such as an ANSI network), the two networks need to be connected with a translator between them. Further, when a data network (such as the Internet) is connected to the GSM-ANSI system, a translator needs to be interposed between the GSM and the data network as well as another translator between the ANSI and the data network. Such a GSM-ANSI-data system then has three networks and three translators translating between them.

The use of three separate translators necessitates additional equipment costs and involves the multiple entry of subscriber information. Further, there is an increase in the number of network based messages passing between the different components of the networks.

DETAILED DESCRIPTION

Embodiments of the present invention provide cross protocol interoperability for registering a station on a network regardless of the protocol of the requesting station or network. In this way, a communications session can be created between the requesting station or network and any of a number of additional networks in which the station would require registration in order to deliver features, functionality, or service.

Embodiments can be performed by software, application modules, and computer executable instructions operable on the systems and devices shown herein or otherwise. The invention, however, is not limited to any particular operating environment or to software written in a particular programming language. Software, application modules and/or computer executable instructions, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments or elements thereof can occur or be performed at the same point in time.

As one of ordinary skill in the art will appreciate upon reading this disclosure, a network infrastructure can support a communications session. Communications sessions include, for example, data transfer, voice transfer, video transfer, and a mix of data, voice, and/or video, to name a few.

The infrastructure embodiments are operable to initiate a communications session from one station (first requesting station) to another station (target station). A station can be any interface equipment used to receive and transmit information to and/or from a user. Examples of stations include mobile devices, handsets, or computer terminals, among others. The stations can be capable of registering a station on one or more networks.

Registration procedures can be initiated from stations that are operable on one or more of a variety of serving network types including, but not limited to Publicly Switched Telephone Networks (PSTN), global system for mobile communications (GSM) networks, American National Standards Institute (ANSI) networks, Public Wireless Local Area Networks (PWLAN), and/or Internet Protocol (IP) networks, to name a few.

Figure 1:
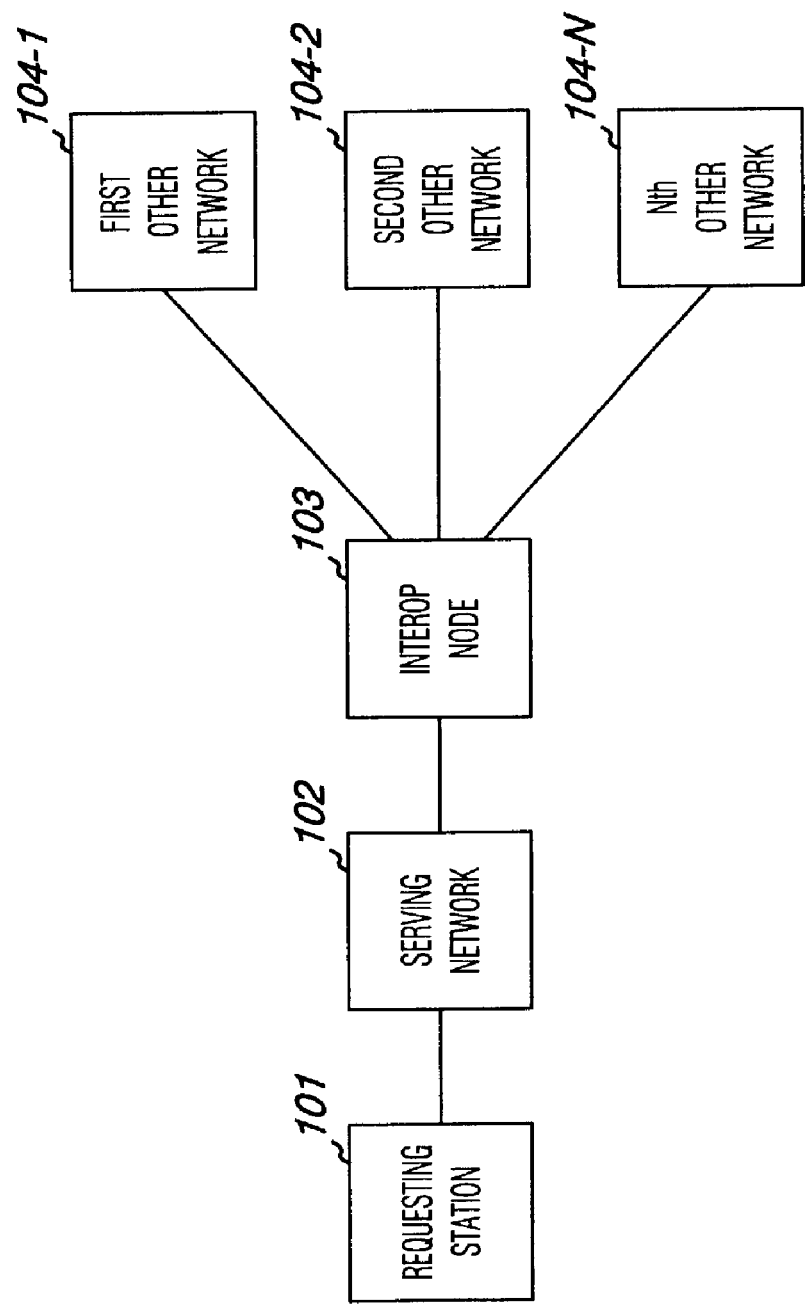
FIG. 1 is a block diagram of a system embodiment illustrating a connection between a requesting station and a number of networks.

FIG. 1 is a block diagram of an interoperability connection according to a system embodiment. In this embodiment, a requesting station 101 is registered on serving network 102 and is attempting to register in one or more other networks, e.g. 104-1 to 104-N. The requesting station 101 is communicating through a serving network 102 and is utilizing an interoperability node 103. The networks 102, 104-1, to 104-N can be of any network type.

The requesting station 101 is operable to interface with an interoperability node 103 that acts to consolidate the registration process on a number of networks by contacting the available additional networks 104-1 to 104-N to identify any additional actions in other protocols that are triggered by registration activities, even though the station is registered in another technology.

Additionally, the serving network 102 can also be a network protocol on the station 101 operable to allow the station 101 to communicate with one or more particular networks. If the requesting station 101 is registered on the serving network 102, then a protocol specific registration process for registering the station 101 on the serving network 102 does not need to be done.

However, if the requesting station 101 is not registered on the serving network 102, then in order to connect the requesting station 101 with another station over the serving network 102, the requesting station 101 will need to be registered on the serving network 102. To accomplish this, the serving network 102 performs a protocol specific registration process that registers the requesting station 101 as an entity authorized to communicate on the network 102.

The interoperability node 103 acts to consolidate the registration process on several networks by contacting the available networks, such as other networks 104-1 to 104-N in this example, to determine if one or more of the networks are awaiting registration of the requesting station 101. If it is determined that a network, e.g. one of the other networks 104-1 to 104-N, is awaiting registration, then the interoperability node 103 can provide properly formatted, protocol specific, information to the one or more other networks 104-1 to 104-N to complete the registration process. Additionally, the interoperability node 103 can provide properly formatted, protocol specific, information to the serving network 102 or to the station 101 to enable it to complete the registration process with the one or more other networks 104-1 to 104-N. With the formatted protocol information, the one or more other networks can then contact the requesting station regardless of protocol and can deliver features, functionality, and/or service.

To accomplish this, the interoperability node 103 is operable to communicate with a number of different networks. In various embodiments, the interoperability node 103 can be located within the requesting station 101, the serving network 102, at an external location, such as within another network, e.g. networks 104-1 to 104-N, or can be independent of any network.

The interoperability node 103 can contact one or more networks, such as 104-1 to 104-N, to determine whether a requesting station 101 is registered thereon. The one or more networks can be operable to each return either a confirmation that the requesting station 101 has a registration identifier associated with the network or reply that the requesting station 101 is not registered on the network.

For example, the interoperability node 103 can contact the first other network 104-1 to ascertain whether the requesting station 101 has a registration identifier associated with the network 104-1. The interoperability node is operable to check each network 102 and 104-1 to 104-N and can do so, for example, serially, by contacting each network individually and waiting for an answer before contacting the next network. The interoperability node can also check each network serially, for example, without waiting to hear an answer before contacting the next station. In various embodiments, the interoperability node can also check the networks in parallel, by signaling a message to several networks simultaneously. However, the invention is not so limited and contact can be accomplished in any number of manners.

Figure 2A:
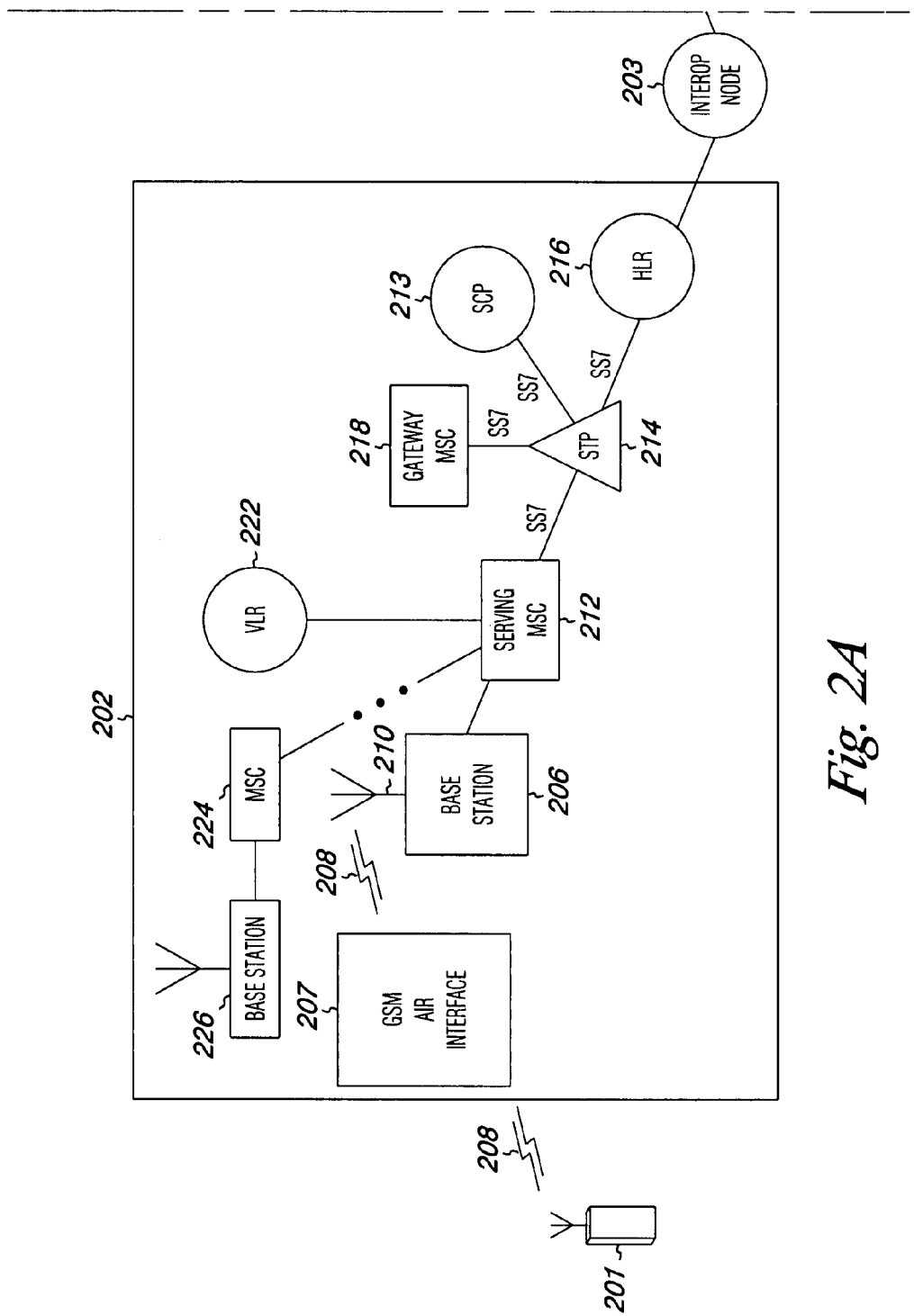
FIG. 2A is a block diagram illustrating an embodiment of a GSM network.
Figure 2B:
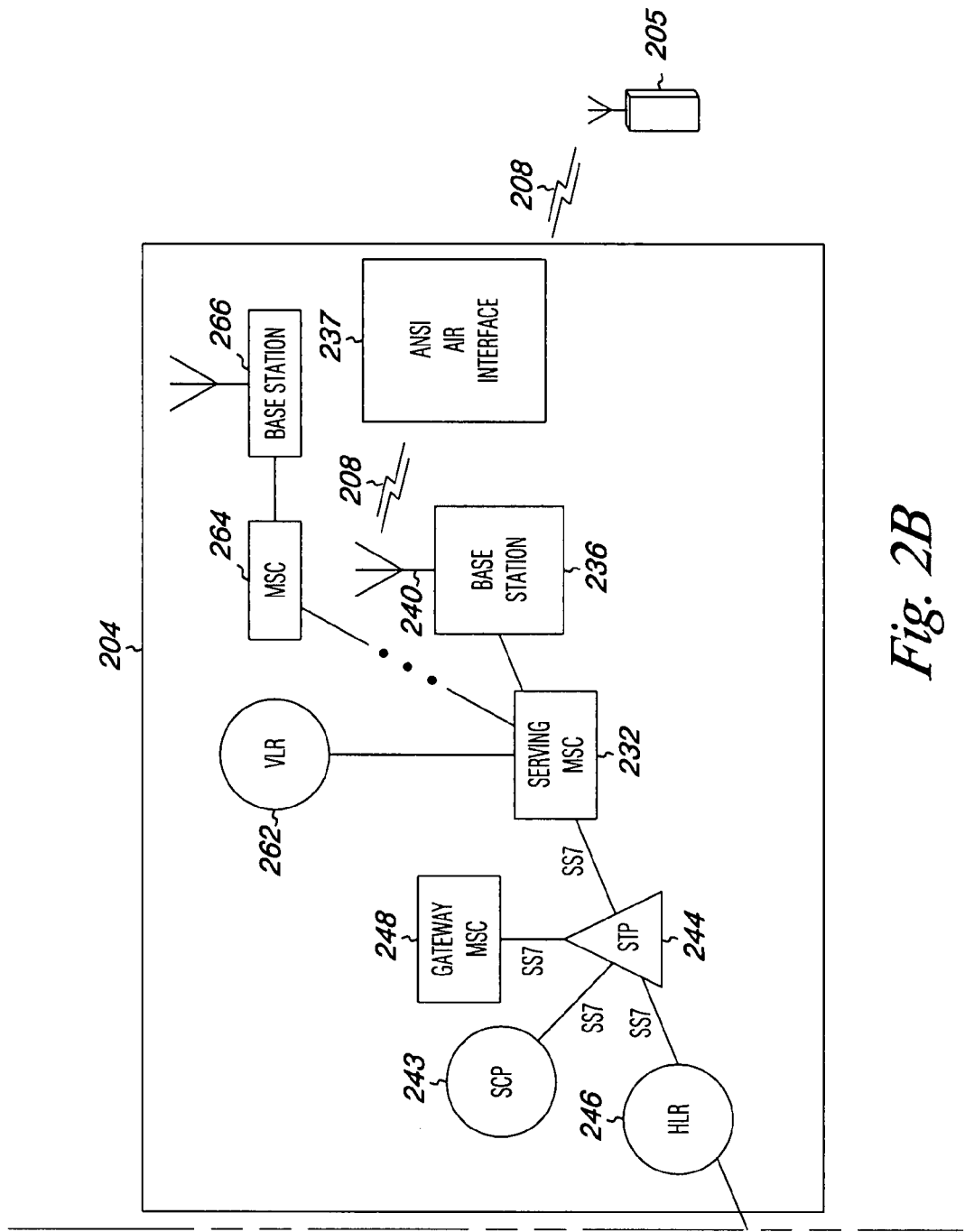
FIG. 2B is a block diagram illustrating an embodiment of an ANSI network.

FIGS. 2A and 2B illustrate an embodiment for the registration of a first requesting station 201 and a second requesting station 205 on a number of networks. In the example shown in FIGS. 2A and 2B, a GSM network and an ANSI network are shown. The invention, however, is not limited to the two types of networks.

The embodiments shown in FIGS. 2A and 2B generally illustrate a block diagram of an embodiment having first requesting station 201, communicating through a GSM network infrastructure 202 and an interoperability node 203 to register the first requesting station 201 on one or both of the GSM network 202 and the ANSI network 204. The embodiments shown in FIGS. 2A and 2B also illustrate a second requesting station 205, communicating through an ANSI network infrastructure 204. As will be discussed more herein, an interoperability node 203 is operable to register the second requesting station 205 on one or both of the ANSI network 204 and the GSM network 202.

Stations, as described herein, can include fixed or mobile devices. These stations can be a part of or interface one or more networks in order to provide a communications session. In FIGS. 2A and 2B, the networks shown are operable to be utilized as mobile networks and the structure of these networks is described in detail below. However, the invention is not limited to the structures shown.

FIG. 2A is a block diagram of an interoperability connection according to a system embodiment. In this embodiment, a first requesting station 201 is attempting to register in one or more networks, e.g. 202 and/or 204. The first requesting station 201 is initially communicating utilizing a serving network 202. The serving network shown in FIG. 2A is a GSM network. However, the network 202 can be any network known in the art. Additionally, the serving network 202 can also be a network protocol operable to allow the station 201 to communicate with one or more particular networks.

If the first requesting station 201 is registered on the serving network 202, then the protocol specific registration process for registering the station 201 on the serving network 202 does not need to be done. However, if the first requesting station 201 is not registered on the serving network 202, then in order to connect the first requesting station 201 with another station, such as second requesting station 205, via the serving network 202, the first requesting station 201 must be registered on the serving network 202. To accomplish this, the serving network 202 performs a protocol specific registration process that registers the first requesting station 201 as an entity authorized to operate on the network 202.

Network 202 is interfaced with an interoperability node as defined herein. A registration on a network can trigger the interoperability node 203 to contact one or more other available networks, such as 204, to determine whether a first requesting station 201 is registered thereon. The interoperability node 203 can identify any additional actions in other protocols or networks that are triggered by the registration activities even though the station is registering in another technology. The networks each return either a confirmation that the first requesting station 201 has a registration identifier associated with the network or reply that the first requesting station 201 is not registered on the network. For example, the interoperability node 203 contacts the network 204 to ascertain whether the first requesting station 201 has a registration identifier associated with the network 204.

As noted above, the network example shown in FIG. 2A is a GSM network 202. The GSM network 202 embodiment of FIG. 2A illustrates a first requesting station 201 communicating with a mobile switching center (MSC) 212 through a GSM air interface 207 with a base station 206, for example, via RF signals receivable by antenna 210. The heart of wireless telecommunications networks, such as the examples shown in FIGS. 2A and 2B, is the MSC that is connected to a plurality of base stations dispersed throughout the geographic area serviced by the network.

The geographic area serviced by a wireless telecommunications network is partitioned into a number of spatially distinct areas called "cells." Each MSC is responsible for, among other things, establishing and maintaining calls between stations, such as between a mobile device and a wireline terminal, which is connected to the system via local and/or long-distance networks. An MSC is a telephone switch specialized for wireless and mobility support. An MSC performs various functions, including mobility management, call handoffs, call admission, call control, resource allocation, and so forth.

In FIG. 2A, whenever a station, e.g. mobile device 201, activates or roams into a new MSC coverage area (i.e., the "cell" for which the MSC is responsible), the new MSC becomes the serving MSC 212. The station 201 transmits its stored identity to the new serving MSC via a base station 206. As shown in FIG. 2A, the subscriber identity information is transmitted over a radio channel 208 in a format compliant with an air interface standard and detected by an antenna 210 of base station 206.

Base station 206, in turn, transmits the subscriber identity information to the serving MSC 212, such as for example via a communication line. The procedures and protocol for communication between the base station 206 and the MSC 212 have also been standardized. For an identification of industry standards relating to these communications, reference is made to TIA/EIA/IS634-A, "MSC-BS Interface for Public Wireless Communication Systems."

In order to provide mobile service to the newly registered mobile device 201, the serving MSC 212 transmits a Mobile Application Part (MAP) based signal, such as a registration update signal (GSM message), to a home location register (HLR) 216 via a signaling link such as a signaling transfer point (STP) 214. An STP is a node in the signaling system 7 (SS7) telephone network that routes messages between exchanges and between exchanges and databases that hold subscriber and routing information. An HLR is one such database in a cellular system that contains all the subscribers within the provider's home service area. The data in the HLR is requested and transferred via SS7 to a visitor location register (VLR) 222 in the new area.

In the embodiment of FIG. 2A, the STP 214 can also route the MAP based signal to a gateway MSC 218. The SS7 network sets up and tears down the call, handles all the routing decisions and supports all modem telephony services, such as local number portability (LNP). LNP allows a telephone subscriber to port his/her phone number when that subscriber relocates to a different region of the country, even when the local area code may be different. The voice switches known as service switching points (SSPs) query service control point (SCP) 213 databases using STPs as packet switches.

Accessing databases using a separate signaling network, e.g. SS7, enables the system to more efficiently obtain static information such as the services a customer has signed up for and dynamic information such as ever-changing traffic conditions in the network. In addition, a voice circuit is not tied up until a connection is actually made between both parties.

There is an international version of SS7 standardized by the ITU, and national versions determined by each country. For example, ANSI governs the US standard for SS7, and Telcordia (Bellcore) provides an extension of ANSI for its member companies.

The MAP based signal typically signaled over SS7 informs the HLR 216 of the network address associated with the MSC 212 currently serving the mobile device 201 and also requests requisite subscriber information for providing mobile service to the roaming mobile device 201. The HLR 216 updates its database to store the network address representing the serving MSC 212 and also copies the requested subscriber information to the VLR 222 associated with the serving MSC 212. The network address representing the serving MSC 212 stored in the HLR 216 is later utilized by the mobile network to reroute any incoming call intended for the mobile device 201 to the serving MSC 212.

Accordingly, whenever a telecommunications subscriber dials a telephone number for the mobile device 201, the HLR 216 is queried by the mobile network to determine the current location of the mobile device 201. Utilizing the stored network address in HLR 216 representing the serving MSC 212, the HLR 216 requests a roaming number from the serving MSC 212 in response to the receipt of the query signal. The roaming number provided by the serving MSC 212 is then used by the telecommunications network to route the incoming signal towards the serving MSC 212. The serving MSC 212 then pages the mobile device 201 and accordingly establishes a voice connection with the mobile device 201, if available.

If the mobile device 201 roams out of the serving MSC 212 coverage area and into another MSC 224 coverage area, MSC 212 will hand-off the communication to MSC 224 and base station 226. To ensure compatibility between two MSCs, the procedures and protocol for the format and transmission of messages have been standardized.

In the example of mobile device call delivery, a visited network tracks the location of a roaming user and a visitor location register (VLR) reports that location information via a control network to the home location register (HLR) of the home network. Control networks may include ANSI/IS-41 and GSM MAP types of networks, among others. An authentication center (AC) in a home network can be used for user registration and authentication, e.g., checking to see, among other things, if the user has made payments. When a call, relayed from the PSTN to the home mobile switching center (MSC) is to be delivered to a subscriber, the home MSC consults the HLR to determine the current whereabouts of the subscriber, e.g. the current serving/visited MSC, and the call is then directed via links and the PSTN to the visited MSC currently serving the device.

Embodiments of the invention provide an interoperability node 203 to act as a registrar of a station on a number of networks. In the embodiment shown in FIGS. 2A and 2B, the first requesting station 201 will, through the serving network 202, ask the interoperability node 203 to check to see if the first requesting station 201 is registered on the networks 202 and/or 204. The registration with one or more networks can also trigger an interoperability node to identify any additional actions that may be waiting to be performed on the one or more networks.

The interoperability node 203 can be an independent unit as shown in the embodiment of FIG. 2A, or can be a part of one of the networks 202 or 204 or station 201. If located within a network such as 202 or 204, the interoperability node 203 can be independent or can be integrated with another element of the network such as the HLR, SCP, or STP. However, the location of the interoperability node is not so limited.

In FIG. 2B, an ANSI network 204 includes a second requesting station 205 communicating with an MSC 232 through an ANSI air interface 237 with a base station 236 having an antenna 240. As with the first requesting station 201 of FIG. 2A, whenever a second requesting station, e.g. 205, activates or roams into a new MSC 264 coverage area (i.e., the "cell" for which the MSC is responsible), the new MSC 264 becomes the serving MSC. The station 205 transmits its stored identity to the new serving MSC 264 via a base station 266.

As shown in FIG. 2B, the subscriber identity information can be transmitted over a radio channel 208 in a format compliant with an air interface standard, e.g. ANSI/IS-41, and detected by an antenna 240 of base station 236. Base station 236, in turn, can transmit the subscriber identity information to the serving MSC 232.

In order to provide mobile service to the newly registered mobile device 205, as the serving MSC 232, can transmit a MAP based signal, such as a registration notification signal (IS-41 message) to an HLR 246 via a signaling link such as an STP 244. The data in the HLR can be requested and transferred via SS7 to a VLR 262 in the new area.

In the embodiment of FIG. 2B, the STP 244 can be operable to route the MAP based signal to a gateway MSC 248. The SS7 network can set up and tear down the call, handle all the routing decisions, and support all modern telephony services, such as LNP. The SSPs can query SCP 243 databases using STPs as packet switches.

In the embodiment shown in FIGS. 2A and 2B, the first requesting station 201 can communicate through the serving network 202 and can gain registration in a second network 204 via an interoperability node 203. The interoperability node 203 can also signal each of the other networks, e.g. second network 204 to trigger any actions that waiting are on the network 204 and directed to the station 201. For example, the network 204 may be waiting to signal a text message to station 201. The interoperability node can trigger the signaling of the text message from the network 204 to the station 201.

Additionally, FIGS. 2A and 2B illustrate the connection of a second requesting station 205 to the system. Similarly, this second requesting station 205 can gain registration on both the GSM 202 and ANSI 204 networks through utilization of the interoperability node 203 as described herein.

In this embodiment, the station 205 can communicate with network 204 to complete a protocol specific registration process. The information from that process can also be submitted to the interoperability node 203 to be dispersed to other networks, such as network 202, or information about the registration process for other networks, such as network 202, can be supplied to the interoperability node 203, the station 205, or to network 204 to enable the station 205 to be registered on other networks, e.g. network 202.

Figure 3:
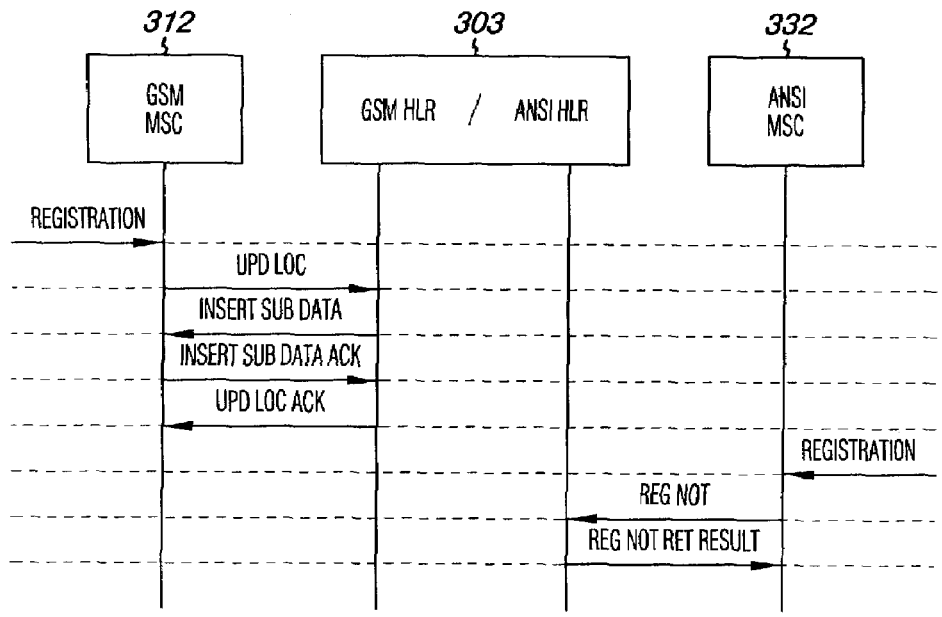
FIG. 3 is a scenario diagram illustrating an embodiment of the communication between a GSM network and an ANSI network for registering a station.

FIG. 3 illustrates an embodiment of the information exchange between network entities regarding the registration of a station. In FIG. 3, a GSM network is communicating with an ANSI network through an interoperability node. In this embodiment, each horizontal arrow represents a communication within or between networks and the communication arrows are read from top to bottom.

In the embodiment shown in FIG. 3, the station (not shown) is registered on a GSM network and is seeking registration on an ANSI network. Once the registration is performed on the ANSI network, the connection is handed off to the ANSI network. In this embodiment, a message initiating registration, e.g. REGISTRATION, is initiated by the requesting station (not shown) to the MSC 312 of the GSM network. An update location message, e.g. UPD LOC, is forwarded to the GSM HLR of a combined GSM HLR/ANSI HLR shown in FIG. 3 and described below.

In the embodiment shown in FIG. 3, the GSM HLR and the ANSI HLR are combined in GSM HLR/ANSI HLR 303. This combined entity GSM HLR/ANSI HLR 303 includes an interoperability node that translates information between the at least two HLRs (there are two shown in this example, but those skilled in the art will understand that a number of HLRs can be combined or that an HLR can have an interoperability node that can translate between two or more HLRs. If the GSM HLR and the ANSI HLR are independent elements, an interoperability node is interposed between the HLRs, can be resident in one of the HLRs, or independent.

The GSM HLR signals for the GSM MSC 312 to insert subscriber data, e.g. INSERT SUB DATA, for performing the registration process. The GSM MSC 312 acknowledges the request and signals the GSM HLR with subscriber data, e.g. INSERT SUB DATA ACK.

Since the networks can communicate differently at this stage of their communication, e.g. operate according to different protocols, the interoperability node can translate the message such that the information communicated to the ANSI HLR is receivable and understandable, e.g. properly formatted in the protocol of the ANSI network. If a single HLR is acting as both the GSM HLR and the ANSI HLR, as it is in the example of FIG. 3, then this message can be signaled internally or may not need to be signaled.

The message is translated by the interoperability node connecting the GSM HLR with the ANSI HLR. The GSM HLR signals the GSM MSC 312 that the request for registration has been received and signals the necessary information to the GSM MSC 312 for the station to register on the ANSI network, e.g. UPD LOC ACK.

The station then contacts the ANSI MSC 332 to request registration thereon, e.g. REGISTRATION. The ANSI MSC 332 provides a notice of the request for registration to the ANSI HLR, e.g. REG. NOT.

A notice of the registration result is signaled from the ANSI HLR to the ANSI MSC 332, e.g. REG. NOT. RET. RESULT. The ANSI MSC 332 updates the registration information and forwards it to the station and the hand-off is completed.

Figure 4:
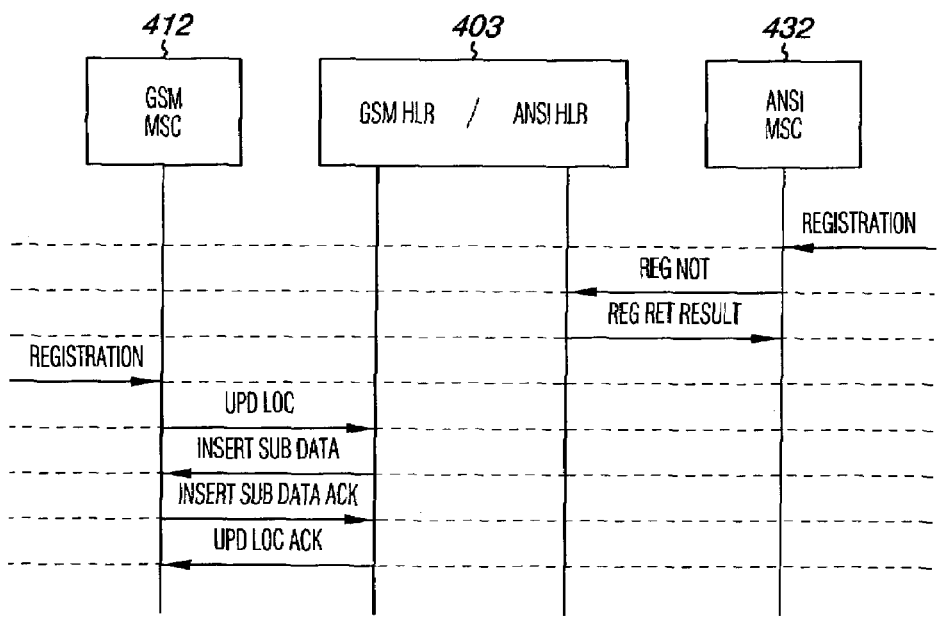
FIG. 4 is a scenario diagram illustrating another embodiment of the communication between an ANSI network and a GSM network for registering a station.

FIG. 4 illustrates another embodiment of the information exchange between network entities regarding the registration of a station. In this figure, an ANSI network is communicating with a GSM network through an interoperability node.

In the embodiment shown in FIG. 4, the station (not shown) is registered on an ANSI network and is seeking registration on a GSM network. Once the registration is performed on the GSM network, the connection is handed off to the GSM network. In this embodiment, a message requesting registration, e.g. REGISTRATION, is initiated by the requesting station (not shown) to the MSC 432 of the ANSI network. A notice of the registration request message, e.g. REG. NOT., is forwarded to the ANSI HLR of a combined GSM HLR/ANSI HLR shown in FIG. 4 and described below.

In the embodiment shown in FIG. 4, the ANSI HLR and the GSM HLR are combined in GSM HLR/ANSI HLR 403. This combined entity GSM HLR/ANSI HLR 403 includes an interoperability node that translates information between the HLRs as previously described with respect to FIG. 3.

The message is translated by the interoperability node connecting the GSM HLR with the ANSI HLR to obtain the information necessary for registering in the GSM network. The ANSI HLR provides a registration return result signal, e.g. REG. RET. RESULT, including appropriate information for the station to perform the registration process.

The station then contacts the GSM MSC 412 to request registration thereon, e.g. REGISTRATION. The GSM MSC 412 provides a request for an updated location/registration to the GSM HLR, e.g. UPD. LOC.

The GSM HLR signals for the GSM MSC 412 to insert subscriber data, e.g. INSERT SUB DATA, for performing the registration process. The GSM MSC 412 acknowledges the request and signals the GSM HLR with subscriber data, e.g. INSERT SUB DATA ACK.

The GSM HLR signals the GSM MSC 412 that the request for registration has been received and that registration has been performed, e.g. UPD LOC ACK. The GSM MSC 412 updates the registration information and forwards it to the station and the hand-off is completed.

Figure 5:
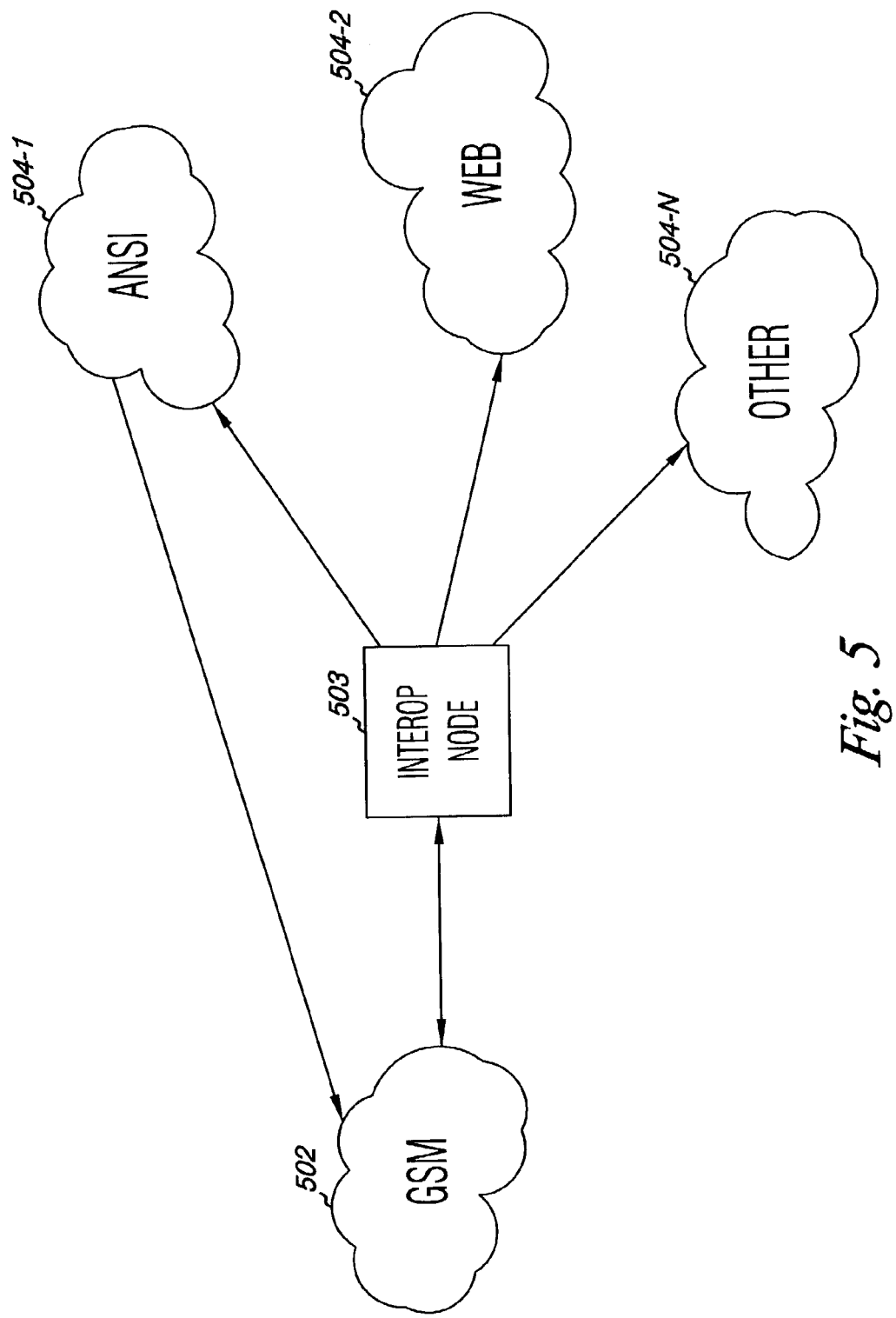
FIG. 5 is a block diagram of an embodiment which depicts the interoperability of a number of networks.

FIG. 5 illustrates the communication between several networks through an interoperability node. In the example shown, a requesting station (not shown), registered on a first network (labeled GSM) 502, is attempting to register on one of a number of other networks present. In the embodiment of FIG. 5, three other networks are shown, including 504-1, 504-2, and 504-N (labeled ANSI, WEB, and OTHER). However, the invention is not limited to the number and/or the types of networks illustrated in FIG. 5. Networks 504-1 to 504-N represent other networks which may be available to the station. In the embodiment of FIG. 5, networks 504-1 to 504-N all have an interface capability to interface with the interoperability node 503. In this embodiment, the first network 502 signals the interoperability node 503 to register in one or more of the other networks 504-1 to 504-N. The interoperability node 503 contacts the one or more networks 504-1 to 504-N to identify if the requesting station is registered on one or more of the networks.

Each contacted network responds either confirming that the station is registered or that it is not or even if registration is available for the station on a particular network. If the station is not registered, the network, e.g. 504-1, performs a protocol specific registration process with either the station itself, the first network 502, or the interoperability node 503. The network, e.g. 504-1, then signals registration information to either the station itself, the first network 502, or the interoperability node 503.

In the embodiment of FIG. 5, this information can include one or more identifiers, such as telephone numbers, subscriber identification numbers, domain names, IP addresses, and/or actions to be taken on the network, among others. The registration information can also include status information, for example, or whether the station or network is busy, among others. This list, however, is not exhaustive and more or less than all of the information listed can be provided in various embodiments.

Embodiments of the interoperability node 503 can be operable to map all identifiers received from the different networks, i.e. 502 and 504-1 to 504-N, to each other to thereby provide a listing of possible network connections available for the requesting station.

Embodiments of the interoperability node 503 can provide all or some of the information described above, e.g. information from all networks that are not busy, to the serving network 502 or station in an appropriate format to successfully confirm the registration on the one or more other networks, e.g. 504-1 to 504-N. In various embodiments, this communication can be conducted through the interoperability node 503, where the node 503 translates information such that the networks can understand each other.

Additionally, one or more of the first requesting station, serving network 502, and/or interoperability node 503 can be operable to determine a preferred connection based upon the one or more network registrations. Some criteria that can be utilized to evaluate the preferred connection can include speed of communication through a particular network, cost of transmission, and quality of transmission, among others.

The communication can also be conducted directly between the station and the one or more networks on which the station is to be registered. In various embodiments, a translation protocol can, for example, be signaled from the interoperability node 503 to a station or a particular network, e.g. 504-1, to allow the requesting station to communicate with the particular network. In the embodiment of FIG. 5, network 504-1 is illustrated signaling directly to the first network, e.g. GSM network 502. In various embodiments, the ANSI network can be signaling its registration information to GSM network 502. However, the invention is not so limited.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A wireless system, comprising:
   multiple different network protocols; and
   an interoperability node operable on the system to:
   communicate with the multiple different network protocols;
   consolidate the registration process on the multiple different network protocols; and
   register a station pending registration at one of the multiple different network protocols by:
   identifying a particular protocol specific registration process from a number of protocol specific registration processes;
   utilizing the particular protocol specific registration process to directly access information from a network being signalled; and
   completing the particular protocol specific registration process based upon the accessed information.

2. The system of claim 1, wherein the interoperability node is operable to identify additional actions triggered, by the registration of the station, in one or more of the multiple different network protocols wherein the station is not registered.

3. The system of claim 1, wherein the interoperability node is operable to alert the station that the station has been registered in one of the multiple different network protocols.

4. The system of claim 1, wherein the interoperability node is operable to communicate a compatible registration format to the station.

5. The system of claim 1, wherein the interoperability node is operable to complete the protocol specific registration process with one of the multiple different network protocols.

6. The system of claim 5, wherein the multiple different network protocols are each operable to communicate directly with a station once registration has been achieved.

7. A wireless architecture, comprising:
a first network type operable to communicate with a station; and
an interoperability node operable on the architecture to:
communicate with multiple different network protocols;
consolidate the registration process on multiple different network protocols; and
register a station in one or more other network types by:
identifying a particular protocol specific registration process from a number of protocol specific registration processes;
utilizing the particular protocol specific registration process to directly access information from a network being signaled; and
completing the particular protocol specific registration process based upon the accessed information.

8. The wireless architecture of claim 7, wherein the interoperability node is registered within a service control point (SCP) in an American National Standards Institute (ANSI) network type.

9. The wireless architecture of claim 7, wherein the interoperability node is registered within a signal transfer point (STP) in an American National Standards Institute (ANSI) network type.

10. The wireless architecture of claim 7, wherein the interoperability node is registered within a service control point (SCP) in a global system for mobile communications (GSM) network type.

11. The wireless architecture of claim 7, wherein the interoperability node is operable to complete the protocol specific registration process with one of the other network types.

12. A wireless architecture, comprising:
a global system for mobile communications (GSM) network operable to connect to a mobile device;
a voice network operable to connect to a mobile device;
a data network operable to connect to the mobile device; and
logic means operable on the architecture to:
communicate with the GSM, voice and data network;
consolidate the registration process on the GSM, voice and data networks; and
register a station with one or more of the GSM, voice and data networks by:
identifying a particular protocol specific registration process from a number of protocol specific registration processes;
utilizing the particular protocol specific registration process to directly access information from a network being signaled; and
completing the particular protocol specific registration process based upon the accessed information.

13. The architecture of claim 12, wherein logic means includes logic means operable to communicate that the station has been registered on one of the GSM, voice and data networks.

14. A method for wireless operation between a voice network and a data network, comprising;
interfacing a global system for mobile communications (GSM) network, a voice network, and a data network to an interoperability node;
signaling the interoperability node to register a station at one of the GSM, voice and data networks;
identifying a particular protocol specific registration process from a number of protocol specific registration processes;
utilizing the particular protocol specific registration process to directly access information from the network at which the station is to be registered;
completing the particular protocol specific registration process based upon the accessed information; and
signaling to the interoperability node that the station has been registered.

15. The method of claim 14, wherein the method further includes alerting the station that the registration has been achieved.

16. The method of claim 15, wherein the method further includes transmitting a compatible registration format to the station.

* * * * *